S. AUGSPURGER.
Harvester.
No. 41,593.    Patented Feb. 16, 1864.
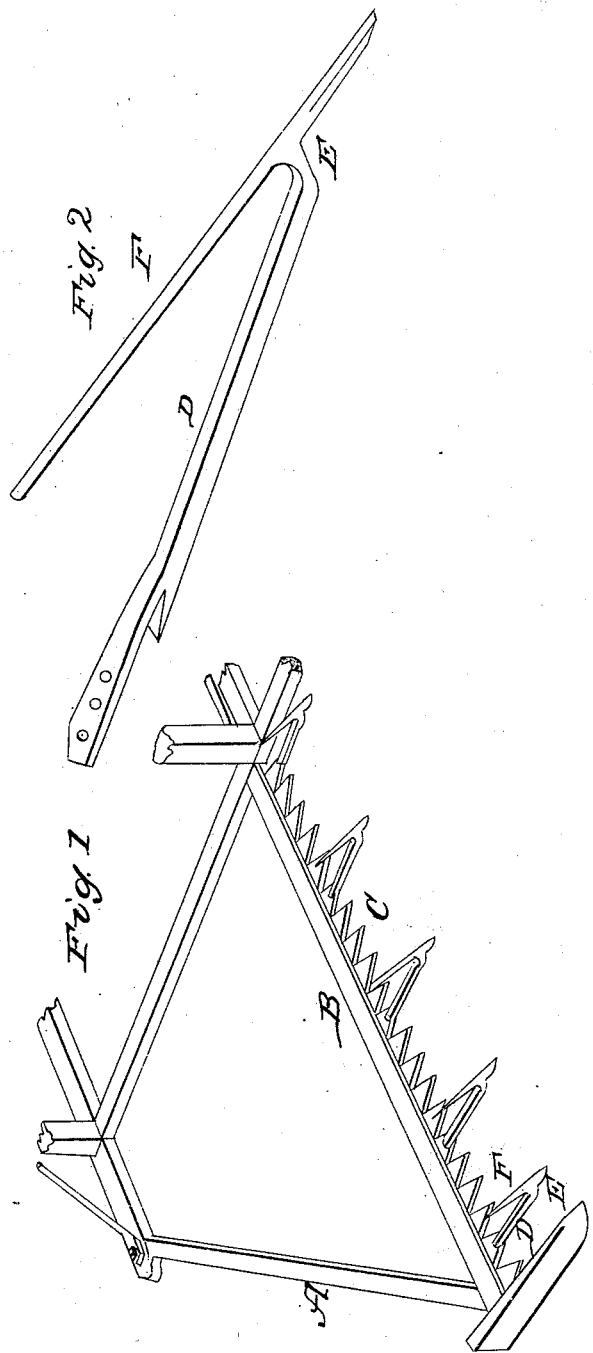
WITNESSES
Charles L. Fisher
P. T. Baldauff
INVENTOR
Saml. Augspurger
pr Knight Bro.
attys

UNITED STATES PATENT OFFICE.

SAMUEL AUGSPURGER, OF TRENTON, OHIO.

IMPROVEMENT IN HARVESTERS.

Specification forming part of Letters Patent No. 41,593, dated February 16, 1864.

*To all whom it may concern:*

Be it known that I, SAMUEL AUGSPURGER, of Trenton, Butler county, Ohio, have invented a new and useful Improvement in Harvesters; and I do hereby declare the following to be a full, clear, and exact description thereof, reference being had to the accompanying drawings, making part of this specification.

My invention relates to an attachment to the fingers or guards of a reaping-machine of a device adapted to elevate fallen and tangled grain and to conduct it to the reel and sickle.

Figure 1 represents a portion of a platform and finger-bar provided with my improvement. Fig. 2 represents my lifting device detached.

A represents a portion of the platform-frame. B represents a finger-bar. C represents the ordinary guards or fingers against which the sickle works.

My lifters may be four or more in number, and may be formed and applied as follows: D is a bar attached either to a finger or to the finger-bar, and projecting horizontally forward about two feet to a point, E, from which a long straight finger or spur, F, extends obliquely backward in close proximity and nearly tangential to the sweep of the reel, and a few inches farther back than the nearest portion of said sweep. The lifter D E F in entering leaning, prostrate, and tangled grain acts to raise the stalks to a vertical position and well up to the action of the reel, which is thus enabled to sweep them backward in a uniform and complete manner onto the platform, so as to make the cutting action more certain and effective, and so as to enable the raker to deposit the grain in uniform gavels for binding. When, however, the condition of the standing grain is so good as to render such appendages unnecessary, or when the machine is desired for mowing, the lifters may be unscrewed from the finger-bar.

I claim as new and of my invention—

A detachable elevating device for lodged or tangled grain, mounted rigidly upon and supported by the fingers C, and consisting of a horizontal arm, D, and inclined arm F, occupying the same vertical plane, the latter being attached by its intermediate part to the front of the horizontal arm D, and projecting in front below and beyond the same, all as herein shown and described, and for the purposes specified.

In testimony of which invention I hereunto set my hand.

SAML. AUGSPURGER.

Witnesses:
GEO. H. KNIGHT,
CHARLES L. FISHER.